United States Patent
Liang et al.

(10) Patent No.: US 10,409,491 B2
(45) Date of Patent: Sep. 10, 2019

(54) METHOD OF DATA ANALYSIS AND EXTRACTION FOR EMBEDDED SECURITY DEVICES

(71) Applicant: XLY SALVATIONDATA TECHNOLOGY INC., NeiJiang, Sichuan (CN)

(72) Inventors: Xiaoning Liang, NeiJiang (CN); Chaoming Xu, NeiJiang (CN); Fei Zhao, NeiJiang (CN)

(73) Assignee: XLY SALVATIONDATA TECHNOLOGY INC., Neijian (CN)

( * ) Notice: Subject to any disclaimer, the term of this patent is extended or adjusted under 35 U.S.C. 154(b) by 0 days.

(21) Appl. No.: 15/759,603

(22) PCT Filed: Dec. 1, 2016

(86) PCT No.: PCT/CN2016/108182
§ 371 (c)(1),
(2) Date: Mar. 13, 2018

(87) PCT Pub. No.: WO2017/092684
PCT Pub. Date: Jun. 8, 2017

(65) Prior Publication Data
US 2019/0042088 A1  Feb. 7, 2019

(30) Foreign Application Priority Data
Dec. 4, 2015  (CN) .......................... 2015 1 0884733

(51) Int. Cl.
*H04N 5/765* (2006.01)
*G06F 3/06* (2006.01)
*H04N 9/80* (2006.01)

(52) U.S. Cl.
CPC .............. *G06F 3/0604* (2013.01); *G06F 3/06* (2013.01); *G06F 3/0655* (2013.01); *G06F 3/0676* (2013.01)

(58) Field of Classification Search
CPC ........ G06F 3/06; G06F 3/0604; G06F 3/0655; G06F 3/0676
(Continued)

(56) References Cited

U.S. PATENT DOCUMENTS

| | | | |
|---|---|---|---|
| 7,697,816 B2 * | 4/2010 | Takada | ..................... H04N 5/76 348/143 |
| 2010/0146246 A1 * | 6/2010 | Frank | .................. G06F 9/30032 712/220 |

FOREIGN PATENT DOCUMENTS

| | | |
|---|---|---|
| CN | 1622201 A | 6/2005 |
| CN | 102841907 A | 12/2012 |

(Continued)

OTHER PUBLICATIONS

Mar. 1, 2017 International Search Report issued in Patent Application No. PCT/CN2016/108182.
(Continued)

*Primary Examiner* — Robert Chevalier
(74) *Attorney, Agent, or Firm* — Oliff PLC

(57) ABSTRACT

A method of data analysis and extraction for embedded security devices and belongs to the data recovery field, includes: Analyzing the DBR table of the first sector of a disk, the DBR table records the number of data blocks, the size of each data block, and the start position information of the first data block on a hard disk; Determining the management table of the first data block based on its position and size as recorded in the DBR table, the management table records the offset position, channel and time information of each data stream; Finding the header of the video stream called as video header based on the video stream informa-
(Continued)

tion recorded in the management table of the data block, the video header records the tag header and time information of video decoding.

6 Claims, 4 Drawing Sheets

(58) Field of Classification Search
USPC ....... 386/200, 206, 238, 239, 243, 248, 344, 386/351
See application file for complete search history.

(56) References Cited

FOREIGN PATENT DOCUMENTS

| | | |
|---|---|---|
| CN | 103310814 A | 9/2013 |
| CN | 104811645 A | 7/2015 |

OTHER PUBLICATIONS

Mar. 1, 2017 Written Opinion of the International Searching Authority issued in Patent Application No. PCT/CN2016/108182.

* cited by examiner

| | | | | | | | | | | | | | | | | | |
|---|---|---|---|---|---|---|---|---|---|---|---|---|---|---|---|---|---|
|00000000000|01|00|00|00|00|40|00|00|00|80|00|00|00|00|00|00| @ ǀ |
|00000000016|00|80|20|00|00|00|00|00|00|80|60|1F|00|00|00|00| ǀ  ǀ` |
|00000000032|00|80|60|1F|01|00|00|00|00|A0|60|1F|01|00|00|00| ǀ` |
|00000000048|00|A0|60|38|01|00|00|00|00|40|A3|96|03|00|00|00| `8  @£ǀ |
|00000000064|00|00|00|80|00|00|00|00|1B|00|00|00|00|04|40|00| ǀ   @ |
|00000000080|00|00|00|40|00|00|00|00|00|00|00|00|00|00|00|00| @ |
|00000000096|FF|FF|FF|FF|FF|FF|FF|FF|00|20|00|00|00|00|00|00| ÿÿÿÿÿÿÿÿ |
|00000000112|00|00|00|00|00|00|00|00|00|00|00|00|00|00|00|00| |
|00000000128|00|00|00|00|00|00|00|00|00|00|00|00|00|00|00|00| |
|00000000144|00|00|00|00|00|00|00|00|00|00|00|00|00|00|00|00| |
|00000000160|00|00|00|00|00|00|00|00|00|00|00|00|00|00|00|00| |
|00000000176|00|00|00|00|00|00|00|00|00|00|00|00|00|00|00|00| |
|00000000192|00|00|00|00|00|00|00|00|00|00|00|00|00|00|00|00| |
|00000000208|00|00|00|00|00|00|00|00|00|00|00|00|00|00|00|00| |
|00000000224|00|00|00|00|00|00|00|00|00|00|00|00|00|00|00|00| |
|00000000240|00|00|00|00|00|00|00|00|00|00|00|00|00|00|00|00| |
|00000000256|00|00|00|00|00|00|00|00|00|00|00|00|00|00|00|00| |
|00000000272|00|00|00|00|00|00|00|00|00|00|00|00|00|00|00|00| |
|00000000288|00|00|00|00|00|00|00|00|00|00|00|00|00|00|00|00| |
|00000000304|00|00|00|00|00|00|00|00|00|00|00|00|00|00|00|00| |
|00000000320|00|00|00|00|00|00|00|00|00|00|00|00|00|00|00|00| |
|00000000336|00|00|00|00|00|00|00|00|00|00|00|00|00|00|00|00| |
|00000000352|00|00|00|00|00|00|00|00|00|00|00|00|00|00|00|00| |
|00000000368|00|00|00|00|00|00|00|00|00|00|00|00|00|00|00|00| |
|00000000384|00|00|00|00|00|00|00|00|00|00|00|00|00|00|00|00| |
|00000000400|00|00|00|00|00|00|00|00|00|00|00|00|00|00|00|00| |
|00000000416|00|00|00|00|00|00|00|00|00|00|00|00|00|00|00|00| |
|00000000432|00|00|00|00|00|00|00|00|00|00|00|00|00|00|00|00| |
|00000000448|00|00|00|00|00|00|00|00|00|00|00|00|00|00|00|00| |
|00000000464|00|00|00|00|00|00|00|00|00|00|00|00|00|00|00|00| |
|00000000480|00|00|00|00|00|00|00|00|00|00|00|00|00|00|00|00| |
|00000000496|00|00|00|00|00|00|00|00|00|00|00|00|00|00|00|00| |
|00000000512|00|00|00|00|00|00|00|00|00|00|00|00|00|00|00|00| |
|00000000528|00|00|00|00|00|00|00|00|00|00|00|00|00|00|00|00| |
|00000000544|00|00|00|00|00|00|00|00|00|00|00|00|00|00|00|00| |
|00000000560|00|00|00|00|00|00|00|00|00|00|00|00|00|00|00|00| |
|00000000576|00|00|00|00|00|00|00|00|00|00|00|00|00|00|00|00| |
|00000000592|00|00|00|00|00|00|00|00|00|00|00|00|00|00|00|00| |

Fig.2

| | | |
|---|---|---|
| 138609FF0 | 00 00 00 00 00 00 00 00  00 00 00 00 00 00 00 00 | |
| 13860A000 | 02 00 00 00 5B 9F 04 00  4E D9 27 98 02 00 00 00 | [ NÙ' |
| 13860A010 | BC 05 10 00 4E D9 27 AC  02 00 00 00 0A 68 1B 00 | ¼ NÙ'¬ h |
| 13860A020 | 4E D9 27 C0 02 00 00 00  B9 AF 26 00 4E D9 27 D4 | NÙ'À ¹¯& NÙ'Ô |
| 13860A030 | 02 00 00 00 9A ED 31 00  4E D9 27 E4 02 00 00 00 | ší1 NÙ'ä |
| 13860A040 | 21 48 3D 00 4E D9 37 08  02 00 00 00 A1 B2 48 00 | !H= NÙ7 ¡²H |
| 13860A050 | 4E D9 37 1C 02 00 00 00  CC 03 54 00 4E D9 37 30 | NÙ7 Ì T NÙ70 |
| 13860A060 | 02 00 00 00 B7 4F 5F 00  4E D9 37 44 02 00 00 00 | ·O_ NÙ7D |
| 13860A070 | 19 AE 6A 00 4E D9 37 54  02 00 00 00 DE 13 76 00 | ®j NÙ7T Þ v |
| 13860A080 | 4E D9 37 68 02 00 00 00  BA 6B 81 00 4E D9 37 7C | NÙ7h ºk NÙ7| |
| 13860A090 | 02 00 00 00 AA BC 8C 00  4E D9 37 90 02 00 00 00 | ª¼Œ NÙ7 |
| 13860A0A0 | 91 05 98 00 4E D9 37 A4  02 00 00 00 DB 71 A3 00 | ' ˜ NÙ7¤ Ûq£ |
| 13860A0B0 | 4E D9 37 B4 02 00 00 00  0A C0 AE 00 4E D9 37 C8 | NÙ7´ À® NÙ7È |
| 13860A0C0 | 02 00 00 00 91 43 BA 00  4E D9 37 DC 02 00 00 00 | 'Cº NÙ7Ü |
| 13860A0D0 | 07 6F C5 00 4E D9 47 00  02 00 00 00 BA D9 D0 00 | oÅ NÙG ºÙÐ |
| 13860A0E0 | 4E D9 47 14 02 00 00 00  CC 19 DC 00 4E D9 47 24 | NÙG Ì Ü NÙG$ |
| 13860A0F0 | 02 00 00 00 4E 71 E7 00  4E D9 47 38 02 00 00 00 | Nqç NÙG8 |
| 13860A100 | B6 EB F2 00 4E D9 47 4C  02 00 00 00 4B 22 FE 00 | ¶ëò NÙGL K"þ |
| 13860A110 | 4E D9 47 60 02 00 00 00  31 98 09 01 4E D9 47 74 | NÙG` 1˜ NÙGt |
| 13860A120 | 02 00 00 00 55 D3 14 01  4E D9 47 84 02 00 00 00 | UÓ NÙG„ |
| 13860A130 | 17 13 20 01 4E D9 47 98  02 00 00 00 25 80 2B 01 | NÙG˜ %€+ |
| 13860A140 | 4E D9 47 AC 02 00 00 00  17 EF 36 01 4E D9 47 C0 | NÙG¬ ï6 NÙGÀ |
| 13860A150 | 02 00 00 00 24 D0 42 01  4E D9 47 D4 02 00 00 00 | $ÐB NÙGÔ |
| 13860A160 | 4A C6 4D 01 4E D9 47 E4  02 00 00 00 E6 EC 58 01 | JÆM NÙGä æìX |
| 13860A170 | 4E D9 57 08 02 00 00 00  22 36 64 01 4E D9 57 1C | NÙW "6d NÙW |
| 13860A180 | 02 00 00 00 92 A4 6F 01  4E D9 57 30 02 00 00 00 | '¤o NÙW0 |
| 13860A190 | 6B F4 7A 01 4E D9 57 44  02 00 00 00 37 3C 86 01 | kôz NÙWD 7<† |
| 13860A1A0 | 4E D9 57 54 02 00 00 00  33 B9 91 01 4E D9 57 68 | NÙWT 3¹' NÙWh |
| 13860A1B0 | 02 00 00 00 93 FF 9C 01  4E D9 57 7C 02 00 00 00 | "ÿœ NÙW| |
| 13860A1C0 | FF 49 A8 01 4E D9 57 90  02 00 00 00 DD 94 B3 01 | ÿI¨ NÙW Ý"³ |
| 13860A1D0 | 4E D9 57 A4 02 00 00 00  63 F9 BE 01 4E D9 57 B4 | NÙW¤ cù¾ NÙW´ |
| 13860A1E0 | 02 00 00 00 E0 32 CA 01  4E D9 57 C8 02 00 00 00 | à2Ê NÙWÈ |
| 13860A1F0 | 85 94 D5 01 4E D9 57 DC  02 00 00 00 2B FD E0 01 | …"Õ NÙWÜ +ýà |
| 13860A200 | 4E D9 67 00 02 00 00 00  A0 33 EC 01 4E D9 67 14 | NÙg  3ì NÙg |
| 13860A210 | 02 00 00 00 0B AC F7 01  4E D9 67 24 02 00 00 00 | ¬÷ NÙg$ |
| 13860A220 | EA E8 02 02 4E D9 67 38  02 00 00 00 30 50 0E 02 | êè NÙg8 0P |
| 13860A230 | 4E D9 67 4C 02 00 00 00  4D 92 19 02 4E D9 67 60 | NÙgL M' NÙg` |
| 13860A240 | 02 00 00 00 C6 F7 24 02  4E D9 67 74 02 00 00 00 | Æ÷$ NÙgt |

METHOD OF DATA ANALYSIS AND EXTRACTION FOR EMBEDDED SECURITY DEVICES

FIELD OF THE INVENTION

The present invention belongs to the field of data recovery, and in particular relates to a method of data analysis and extraction for embedded security devices.

BACKGROUND OF THE INVENTION

An embedded system is a "dedicated computerized system designed for specific applications that is entirely embedded in a controlled device". The embedded system serves to control, monitor or assist in devices, machines or facilities in plants. Unlike a general-purpose computer system such as PCs, an embedded system usually executes predefined tasks with specific requirements. Embedded systems are used to control or monitor large-scale equipment such as machines, facilities and plants. In general, an embedded system is an embedded processor control board whose control program is stored in a ROM. In fact, all devices with digital interfaces such as watches, microwaves, video records, cars, etc. use embedded systems. Some embedded systems even include an OS, but most embedded systems realize entire logic control through a single program.

The combination of embedded technology with video coding technology and network communication technology can realize the embedded video surveillance system, Video surveillance is widely used in a variety of other fields such as daily life, corporate management, security, border control and so on, for example: 1. Video surveillance system brings convenience to production. Most basically, video surveillance can replace human monitoring and control in some harsh environments, such a system is in small size with stable performance and can ensure safety as well. In addition, video surveillance does not have physical defects of humans such as visual fatigue, hence ensuring production safety under normal circumstances. 2. Video surveillance brings convenience to life. For example, video surveillance in traffic monitoring features timeliness, accuracy and wide monitoring range, and can notify the traffic police and solve problems at the first time in the event of traffic congestions and accidents. 3. Video surveillance ensures security. The system can be installed in supermarkets, banks, plants, construction sites and other places, to learn about indoor situations, customer behaviors, etc. This can effectively guarantee the rights and interests of bank card holders, monitor the operations of the plant, and improve the social security and safety level. 4. Militarily, video surveillance can be used in military intelligence survey and target tracking. So, video surveillance can bring convenience to all kinds of fields. Meanwhile, data of surveillance videos are also very important.

Especially, when there are abnormal incidents caused by human in life, security and military scenarios, monitoring data can record situations at the time such that people can understand what happened back then. However, when the embedded system runs continuously for a long time, the machine may become erroneous and monitoring data will not be recognized by the embedded system, or the data may be tempered with and therefore cannot be recognized by the system. In such a case, the abnormal incident cannot be reproduced. As a result, research on the predefinition format of the embedded system is of special importance.

Digital Video Recorders (DVRs) that store video data in their hard disks have already replaced analog video recorders. DVRs include PC-DVRs based on PC architecture and embedded DVRs independent from PC architecture. It is a computing system that can independently store and process images with functions including long-time video recording, audio recording, and remote monitoring and control over images and voice. However, the deletion and overwriting of videos for various reasons may easily cause data loss.

Residual and deleted videos cannot be extracted presently and the extraction of data stored in a DVR hard disk may suffer incompatibility as different manufacturers and various types of hard disks will lead to different video stream headers. The present invention will analyze data generated by the firmware algorithm in the wave-particle monitoring, so as to complete the algorithm for data extraction.

SUMMARY OF THE INVENTION

The invention aims at the deficiency of prior art and provides a method of data analysis and extraction for embedded security devices, which can effectively solve the problem where prior art cannot recover the lost files in the unused areas of the monitoring devices.

To solve the above problems, the present invention adopts the following technical solution: A method of data analysis and extraction for embedded security devices, which includes the following steps:

101 Analyzing the DBR table of the first sector of a disk, said DBR table records the number of data blocks, the size of each data block and the start position information of the first data block on said disk DBR table

102 Determining the management table of said first data block based on position and size of said first data block as recorded in said DBR table, said management table records the offset position, channel and time information of each data stream;

103 Finding the header of the video stream called as video header based on the video stream information recorded in said management table of said data block, said video header records the tag header and time information of video decoding;

104 After analyzing said first data block, finding the next data block based on data block size to analyze, which shall be repeated in turn until all monitoring data of said disk are analyzed. Finally, extracting all video data based on the information of video headers and management tables according to principle of time continuity and principle of channel uniformity.

Preferably, said 101 comprises the following steps:

1011 The value of 4 bytes offsetting a length of 0x04 bytes from the start of said DBR table is the number of data stream entries in each data block;

1012 The value of 8 bytes offsetting a length of 0x30 bytes from the start of said DBR table is the start position of the first data block, said offset position is from the disk start position with an offset in bytes;

1013 The value of 8 bytes offsetting a length of 0x40 bytes from the start of said DBR table is the size of each data block in bytes;

1014 The value of 4 bytes offsetting a length of 0x48 bytes from the start of said DBR table is the total number of said data blocks. The start position of each data block is determined by said start position of said first block and block size, the start position of the Nth data block=said start position of said first block+(N−1)*block size, of which N is an integer equal to or greater than 1.

Preferably, said 102 comprises the following steps:

1021 Obtaining the start positions of all data blocks via step 101, said start positions of said data blocks have a certain size to record the management tables. Each data stream entry has a fixed size of 12 bytes, and the size of the management table=the number of data stream entries*12 bytes;

1022 Analyzing said data stream entry. The value of the first 4 bytes is the channel information of said data stream; the value of the middle 4 bytes is the offset value of said data stream from the current data block; and the value of the final 4 bytes is the time information of said data stream.

Preferably, said 103 comprises the following steps:

1031 Finding the position of said data stream via said data stream offset value. The value of the first 4 bytes of said data stream is the video header of a data stream;

1032 The value of 4 bytes offsetting a length of 0x0c bytes from the start position of said data stream is the time information of said data stream;

1033 The value of 8 bytes offsetting a length of 0x10 bytes from the start position of said data stream is the tag header of video decoding, which is necessary for video playing.

The advantageous effects of the present invention are as follows: Firstly, finding management table in the data block via analyzing parameters of DBR table and determining the data block, and then quickly find data via the management table. Finally, extract time-continuous video data of a single channel based on the channel and time linear arrangement of the above data. Based on the above method, the present invention can quickly extract valid video data files in the disk and restore the lost or deleted video data files.

BRIEF DESCRIPTION OF THE DRAWINGS

FIG. 2 is the schematic diagram of analyzing DBR table for step 101;

FIG. 3 is the schematic diagram of analyzing management table for step 102;

Figure 4:
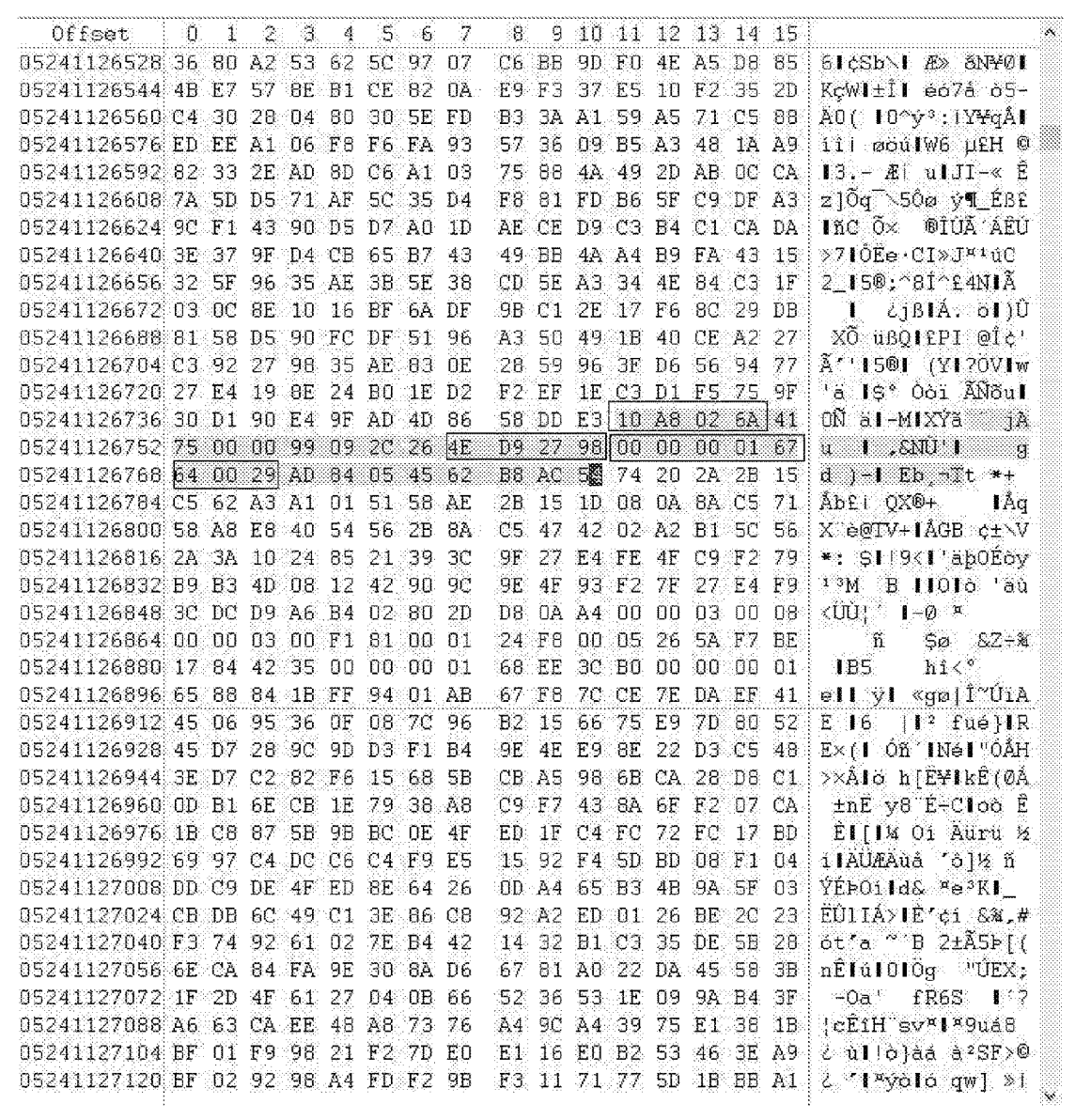

FIG. 4 is the schematic diagram of analyzing video header for step 103.

DETAILED DESCRIPTION OF THE PREFERRED EMBODIMENTS

Figure 1:
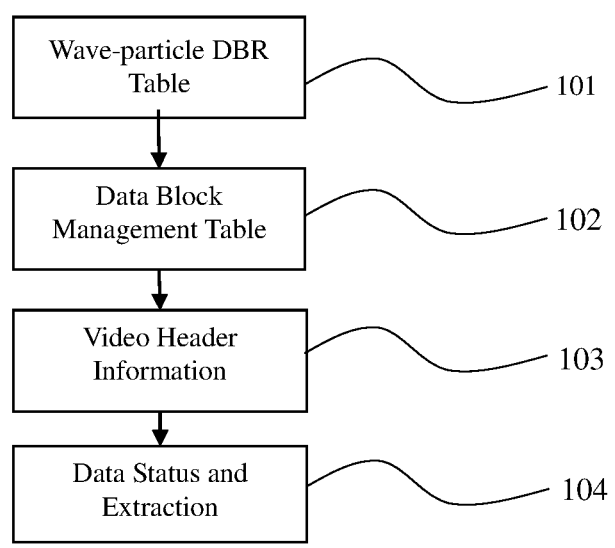
FIG. 1 is the general flowchart of analyzing wave-particle monitoring disk.

In order to make the objectives, technical solutions and advantages of the present invention clearer, the present invention will be further described by using the accompanying drawings and the embodiments.

In view of the above problems, the present invention proposes a method of data analysis and extraction for embedded security devices. The invention can not only efficiently extract normal video data, but also effectively recover abnormal data.

FIG. 1 shows a method of data analysis and extraction for embedded security devices, which includes the following steps:

101 The first sector of the disk (the sector size is less than 512 bytes) is the DBR table of wave-particle monitoring. The DBR table records the number of data blocks, the size of each data block, the start position of the first data block and other key information on the hard disk.

102 Determining the management table of the first data block based on position and size of said first data block as recorded in the DBR table. Each data block has a similar management table that records management information by a data stream. Each data block is composed of multiple data streams, and the management table records the offset position, channel, time and other key information of each data stream.

103 Finding the head of the video stream called as video header based on the video stream information recorded in the management table of the data block. The video header records the tag header, time and other key information of video decoding.

104 After analyzing said first data block, finding the next data block based on data block size to analyze, which shall be repeated in turn until all monitoring data of said disk are analyzed. Finally, extracting all video data based on the information of video header and management tables according to principle of time continuity and principle of channel uniformity.

To make it further, the specific method of 101 is as follows:

1011 FIG. 2 shows the first sector of the disk, which is the DBR table of wave-particle monitoring. The value of 4 bytes offsetting a length of 0x04 bytes from the start of the DBR table is the number of data stream entries in each data block;

1012 The value of 8 bytes offsetting a length of 0x30 bytes from the start of the DBR table is the start position of the first data block, the offset position is from the disk start position with an offset in bytes;

1013 The value of 8 bytes offsetting a length of 0x40 bytes from the start of the DBR table is the size of each data block in bytes;

1014 The value of 4 bytes offsetting a length of 0x48 bytes from the start of the DBR table is the total number of data blocks. In the waive-particle monitoring file system, a data area is divided into data blocks with fixed size for management. The start position of each data block is determined by the start position of the first block and block size; the start position of Nth data block=the start position of the first block+(N−1)*block size, of which N is an integer equal to or greater than 1;

To make it further, the specific method of 102 is as follows:

1021 Obtaining the start positions of all data blocks via step 101. The start positions of the data blocks have a certain size to record the management table (FIG. 3). Each data stream entry has a fixed size of 12 bytes, and the size of the management table=the number of data stream entries*12 bytes;

1022 Analyzing the data stream entry. The value of the first 4 bytes is the channel information of the data stream; the value of the middle 4 bytes is the offset value of the data stream from the current data block, which can be used to find the data stream; and the value of the final 4 bytes is the time information of the data stream;

To make it further, the specific method of 103 is as follows (FIG. 4):

1031 Finding the position of the data stream via the offset value of the data stream. The value of the first 4 bytes of a data stream is the video header of the stream, which usually starts with 0x10;

1032 The value of the 4 bytes offsetting a length of 0x0c bytes from the start position of the data stream is the time information of the data stream;

1033 The value of 8 bytes offsetting a length of 0x10 bytes from the start position of the data stream is the tag header of video decoding, which is necessary for video playing.

To make it further, the specific method of 104 is as follows:

Time-continuous video data of a single channel can be extracted based on the channel and time linear arrangement of the above-analyzed data.

It will be evident to those skilled in the art that the forgoing embodiment is considered to be illustrative in details to help fully understand the present invention and not restrictive. The present invention is protected in a way not limited to the details of the foregoing illustrated descriptions and embodiments. Those skilled in the art may come up with other specific variations and combinations under the enlightenment of the technologies as disclosed by the present invention without departing from the spirit or essential attributes thereof. Such variations and combinations still fall within the protection scope of the present invention.

The invention claimed is:

1. A method of data analysis and extraction for embedded security devices, wherein said method comprises the following steps:
   101 Analyzing the DBR table of the first sector of a disk, said DBR table records the number of data blocks, the size of each data block, and the start position information of the first data block on said disk;
   102 Determining the management table of said first data block based on position and size of said first data block as recorded in said DBR table, said management table records the offset position, channel and time information of each data stream;
   103 Finding the header of the video stream called as video header based on the video stream information recorded in said management table of said data block, said video header records the tag header and time information of video decoding;
   104 After analyzing said first data block, finding the next data block based on data block size to analyze, which shall be repeated in turn until all monitoring data of said disk are analyzed, finally, extracting all video data based on the information of video headers and management tables according to principle of time continuity and principle of channel uniformity.

2. A method of data analysis and extraction for embedded security devices according to claim 1, wherein said 101 comprises the following steps:
   1011 The value of 4 bytes offsetting a length of 0x04 bytes from the start of said DBR table is the number of data stream entries in each data block;
   1012 The value of 8 bytes offsetting a length of 0x30 bytes from the start of said DBR table is the start position of the first data block, said offset position is from the disk start position with an offset in bytes;
   1013 The value of 8 bytes offsetting a length of 0x40 bytes from the start of said DBR table is the size of each data block in bytes;
   1014 The value of 4 bytes offsetting a length of 0x48 bytes from the start of said DBR table is the total number of said data blocks, the start position of each data block is determined by said start position of said first block and block size, the start position of the Nth data block=said start position of said first block+(N−1)*block size, of which N is an integer equal to or greater than 1.

3. A method of data analysis and extraction for embedded security devices according to claim 1, wherein said 102 comprises the following steps:
   1021 Obtaining the start positions of all data blocks via step 101, said start positions of said data blocks have a size to record the management tables, each data stream entry has a fixed size of 12 bytes, and the size of the management table=the number of data stream entries*12 bytes;
   1022 Analyzing said data stream entry, the value of the first 4 bytes is the channel information of said data stream; the value of the middle 4 bytes is the offset value of said data stream from the current data block; and the value of the final 4 bytes is the time information of said data stream.

4. A method of data analysis and extraction for embedded security devices according to claim 3, wherein said 103 comprises the following steps:
   1031 Finding the position of said data stream via said offset value of said data stream, the value of the first 4 bytes of said data stream is the video header of a data stream;
   1032 The value of 4 bytes offsetting a length of 0x0c bytes from the start position of said data stream is the time information of said data stream;
   1033 The value of 8 bytes offsetting a length of 0x10 bytes from the start position of said data stream is the tag header of video decoding, which is necessary for video playing.

5. A method of data analysis and extraction for embedded security devices according to claim 2, wherein said 102 comprises the following steps:
   1021 Obtaining the start positions of all data blocks via step 101, said start positions of said data blocks have a size to record the management tables, each data stream entry has a fixed size of 12 bytes, and the size of the management table=the number of data stream entries*12 bytes;
   1022 Analyzing said data stream entry, the value of the first 4 bytes is the channel information of said data stream; the value of the middle 4 bytes is the offset value of said data stream from the current data block; and the value of the final 4 bytes is the time information of said data stream.

6. A method of data analysis and extraction for embedded security devices according to claim 5, wherein said 103 comprises the following steps:
   1031 Finding the position of said data stream via said offset value of said data stream, the value of the first 4 bytes of said data stream is the video header of a data stream;
   1032 The value of 4 bytes offsetting a length of 0x0c bytes from the start position of said data stream is the time information of said data stream;
   1033 The value of 8 bytes offsetting a length of 0x10 bytes from the start position of said data stream is the tag header of video decoding, which is necessary for video playing.

* * * * *